United States Patent [19]

Norton

[11] Patent Number: 4,493,240

[45] Date of Patent: Jan. 15, 1985

[54] PARACHUTE LINE CUTTING DEVICE

[75] Inventor: Jeffery R. Norton, Spooner, Wis.

[73] Assignee: Stresau Laboratory, Inc., Spooner, Wis.

[21] Appl. No.: 463,021

[22] Filed: Feb. 1, 1983

[51] Int. Cl.³ .......................... B26D 5/12; F42B 4/02
[52] U.S. Cl. ................................. 89/1.14; 30/DIG. 4; 60/632; 102/205; 244/151 B
[58] Field of Search ............... 102/205, 200, 336–337, 102/341; 89/1 B, 1 R; 83/639; 60/635, 632; 30/DIG. 4; 244/142, 149, 151 B

[56] References Cited

U.S. PATENT DOCUMENTS

| | | | |
|---|---|---|---|
| 2,455,336 | 11/1948 | Jones | 102/205 |
| 2,924,147 | 2/1960 | Bohl et al. | 89/1 B |
| 2,926,565 | 1/1960 | Thorness | 244/149 X |
| 3,763,738 | 10/1973 | Temple | 89/1 B |
| 3,942,445 | 3/1976 | Baker et al. | 102/205 |
| 3,976,008 | 8/1976 | Altschuler et al. | 102/205 X |

Primary Examiner—David H. Brown
Attorney, Agent, or Firm—Burns, Doane, Swecker & Mathis

[57] ABSTRACT

An explosive line cutting device is provided with a frictional igniter assembly permitting actuation throughout a broad range of positional attitudes. An insulating sleeve is provided around a pyrotechnic delay charge which substantially reduces deviations of the burning time. Explosive forces are concentrated behind the cutting blade by introducing a flow restriction that impedes release of pressure energy to non-useful parts of the device.

18 Claims, 7 Drawing Figures

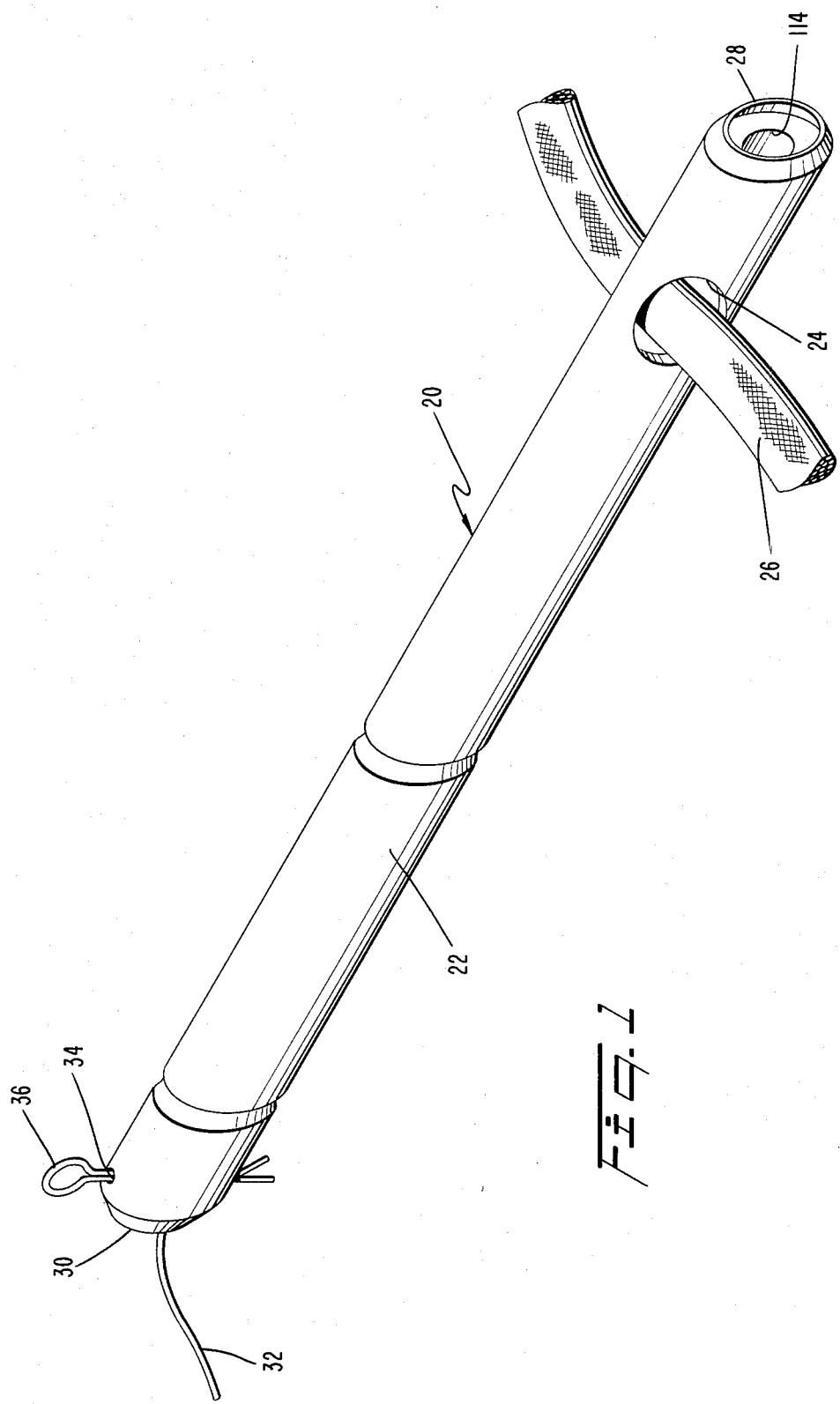

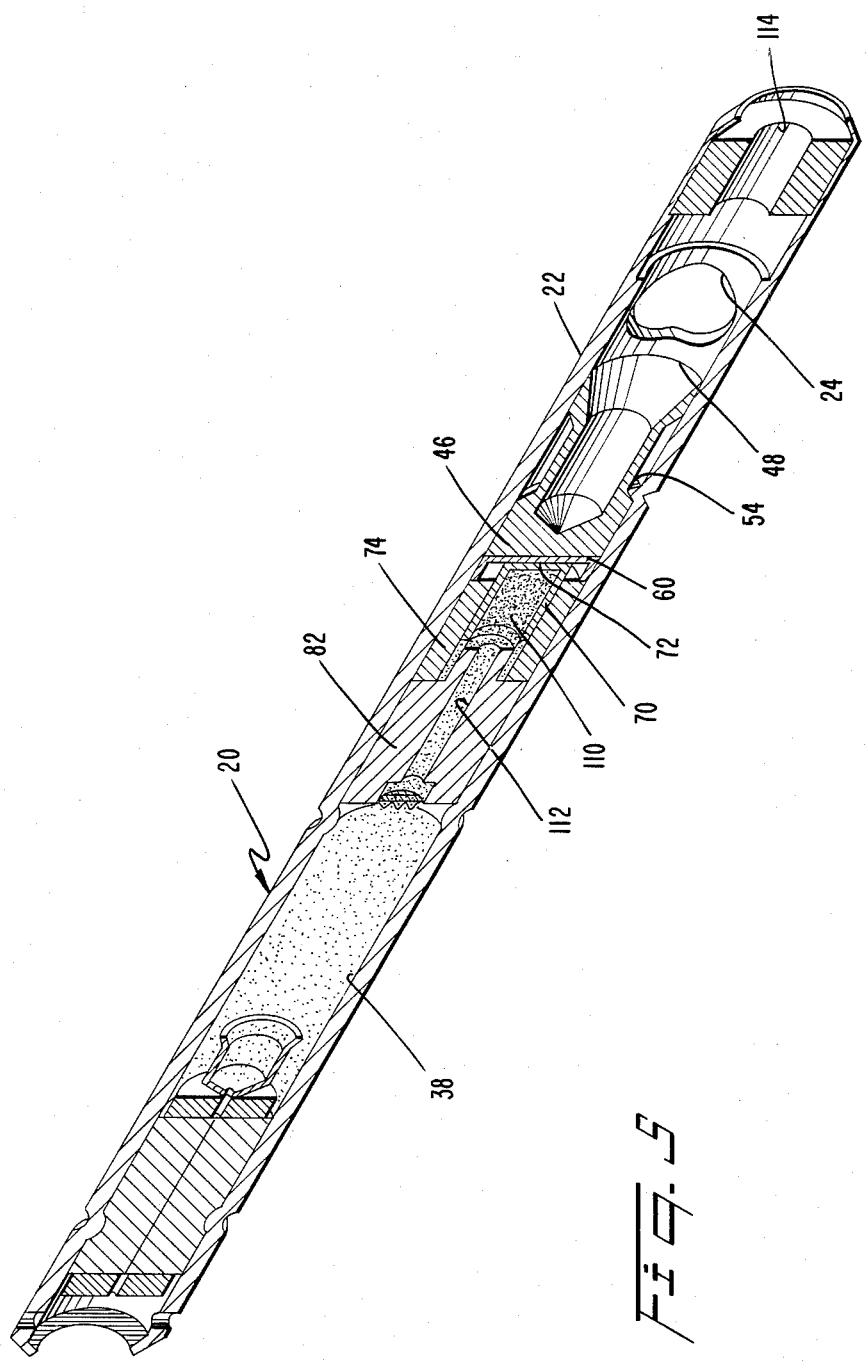

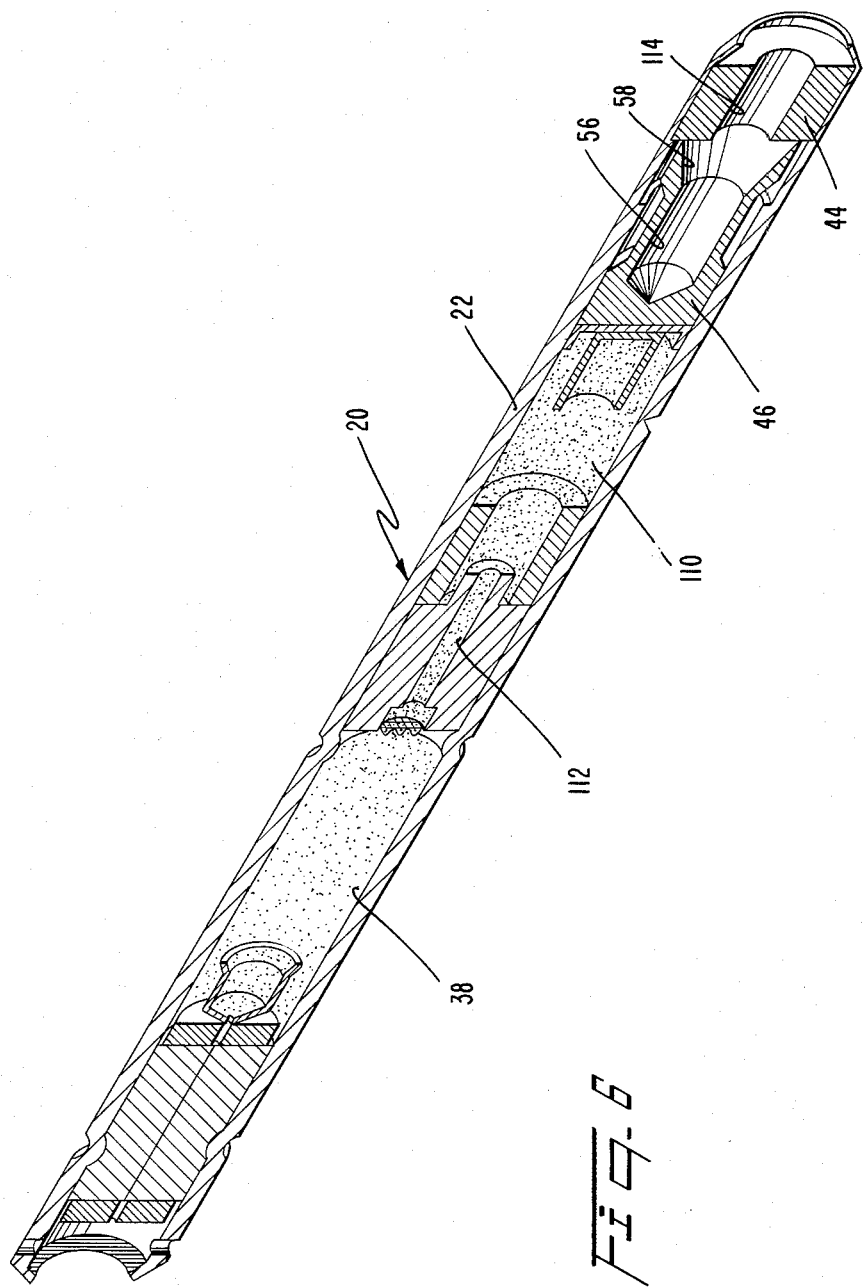

PARACHUTE LINE CUTTING DEVICE

BACKGROUND OF THE INVENTION

The present invention relates generally to line severing devices. More particularly, the present invention concerns pyrotechnically actuated explosive line cutters.

Explosive line cutters have been known for many years. These devices are particularly useful, for example, in the staged deployment of parachutes. Where a drogue chute is used to deploy a main chute, in some instances the drogue chute is subsequently jettisoned and in other instances, the main parachute is deployed in stages, which stages are controlled by reefing lines. A line cutter is a useful device to permit reefing lines to be severed sequentially during staged deployment and also to effect disengagement between a drogue chute and a main chute, where necessary. In other applications, line cutting devices can be used to release a load from an aerial balloon to permit controlled descent of that load by parachute. The foregoing constitute but a few of the examples of the usefulness of explosive line cutting devices.

It will be readily appreciated that a considerable time period may pass between the time an explosive line cutting device is manufactured and the time when the line cutting device is actuated. Thus, it is particularly important that the line cutting devices be highly reliable.

Moreover, it will be seen that where the line cutting device is exposed to the atmosphere it must also operate reliably through a wide range of altitudes, pressures, temperatures and humidity conditions. To the extent that these atmospheric variations can affect a pyrotechnically actuated device, steps must be taken to ameliorate or eliminate any adverse effects resulting from variations in those parameters. In addition, since a line cutting device is often associated with the deployment of a parachute, and since the movements of a parachute during deployment cannot be predicted with a high level of reliability, it will also be appreciated that a line cutting device must be actuated with the line cutting device in a wide variety of positional attitudes.

Parachute line cutting devices are also known in the prior art. A typical line cutting device includes an anvil and a knife which is movable toward the anvil but spaced therefrom by a distance which permits the line to be severed to pass therebetween. The blade is typically propelled by a conventional explosive actuator assembly which may include a primer, a delay charge and an explosive charge. Typically, such line cutters are actuated by a spring-loaded firing pin which is held in a cocked position by a generally inflexible rod. When the rod is removed from the cutter assembly, the compressed spring quickly plunges the firing pin into the primer mix of the actuator assembly. Such a known device is illustrated for example by U.S. Pat. No. 3,452,631 issued to Brizzolara on July 1, 1969 and by U.S. Pat. No. 3,419,960 issued to Hanson on Jan. 7, 1969.

Another type of line cutting device relies upon an electrical circuit to actuate the explosive charge which, in turn, forces a movable knife into engagement with the line to be severed. Such a line cutting device is illustrated, for example, in U.S. Pat. No. 3,991,649 issued to Patrichi on Nov. 16, 1976 and in U.S. Pat. No. 2,924,147 issued to Bohl et al on Feb. 9, 1960.

Different types of devices have also been proposed for explosively destroying part of a line rather than cutting the line. For example, it has been proposed to use an explosive charge which is embedded in a braided rope or cable and connected to an igniting device by a slow match compound. The igniting device may, for example, include a fulminating compound surrounding a barbed wire which compound is fired when the barbed wire is withdrawn. Such a destructible link device is shown, for example, in U.S. Pat. No. 2,768,802 issued to Dejean on Oct. 30, 1956.

Where a parachute or similar article has been deployed and is to open in stages, there is typically no available source of electrical power. Thus, those parachute line cutting devices known in the prior art which require an electrical impulse for actuation are generally unsuitable for staged deployment of remotely operated articles such as parachutes.

Moreover, a reefing line cutting device which uses a rigid rod to release a precocked triggering mechanism cannot be actuated unless the lanyard rod is pulled in a direction almost coaxial with the line cutting device itself. Therefore, in applications where the positional attitude of the line cutting device cannot be predicted with certainty, a precocked line cutting device having a rod-type lanyard is also unsuitable.

There are serious disadvantages associated with those line cutting devices that use either precocked or non-precocked spring. Prococked springs have stored energy which is released when a lanyard is pulled whereas non-precocked springs energize a spring when the lanyard is pulled. The disadvantages of these springs include the need for additional components to obtain the necessary functions of the line cutting device. Moreover, since the line cutting device normally has a two year shelf life, a precocked spring can develop a permanent set during this period of time which reduces the releasable stored energy of the spring. Whether the spring is precocked or non-precocked, undetected fractures in the spring can render the line cutting device inoperative.

In addition there is an operational disadvantage to spring actuated line cutting devices. The line cutting device is often actuated in a dynamic force environment such as a rapidly decelerating falling body. Accordingly, when the operating lanyard is removed, deceleration forces often oppose the resilient movement of the spring thereby impeding its function.

Another common disadvantage of the known line cutting devices is that aspect of their construction which permits gases created during the explosion to expand throughout substantially the entire internal cavity. Such a construction requires a larger explosive charge than is required when the gases are constrained to remain in proximity to the movable blade.

Furthermore, the known pyrotechnically actuated line cutting devices which are provided with a delay compound experience variations in delay time between +25% and −15%. Such variations depend on the ambient temperature and are unacceptable in critical deployment situations.

Accordingly, it will be apparent to those skilled in the art that the need continues to exist for an improved line cutting device which is relatively insensitive to positional attitude, reduces delay time variations, free of electrical actuation, concentrates explosive force at the movable knife and is environmentally sealed. Therefore, it is the object of the present invention to provide a line cutting device which exhibits these desirable features.

SUMMARY OF THE INVENTION

To overcome those problems in the prior art devices which limit the actuation to certain positional attitudes, the explosive line cutting device of the present invention utilizes a housing containing a frictionally actuated ignition device that includes a flexible wire sear or pullwire. The ignition device is operable to thermally ignite a primer of a pyrotechnic assembly which, in turn, causes detonation of an explosive charge behind a movable knife. That explosive charge drives the movable knife forwardly and into engagement with an anvil contained in the housing. The pullwire of the frictional igniter is surrounded by a sealing membrane which protects the pyrotechnic compounds of the ignition device and of the pyrotechnic means from environmental moisture and pressure. In addition, the flexible membrane seal confines within the housing gases liberated when the frictional ignition device as well as from the pyrotechnic device are activated. Moreover, the flexible wire sear permits actuation of the line cutting device from a substantially increased range of positional attitudes.

As noted above, the pyrotechnic device must operate through a wide range of ambient temperatures. To accommodate this wide range of operating temperatures, the line cutting device is preferably provided with an insulating sleeve which surrounds a delay charge of the pyrotechnic assembly. In this fashion, the heat transfer from the exothermic pyrotechnic reaction of the delay charge occurs over a smaller heat transfer area. Thus, less heat is transferred away from the exothermic chemical reaction and a more uniform reaction temperature is maintained.

In addition, a flow restriction device is incorporated in the line cutting device immediately behind the explosive charge and in close proximity to the movable blade. Such an arrangement restricts the flow of gases generated by the explosion back toward the igniter assembly and concentrates those gases released by the explosion adjacent to the movable knife.

Moreover, the spring-free, or non-resilient, actuation eliminates the counterproductive operational effects of accelleration in the dynamic actuating environment.

BRIEF DESCRIPTION OF THE DRAWINGS

Many additional objects and advantages will be apparent to those skilled in the art when this specification is read in conjunction with the attached drawings wherein like reference numerals have been applied to like elements and wherein:

FIG. 1 is an isometric external view of a line cutter made according to the present invention;

FIG. 5 is an isometric partial cross-sectional view similar to FIG. 4 showing the detonation of the explosive charge; and FIG. 6 is an isometric partial cross-sectional view similar to FIG. 5 showing the movable blade forced forwardly and into engagement with the anvil.

DESCRIPTION OF THE PREFERRED EMBODIMENTS

Figure 1A:
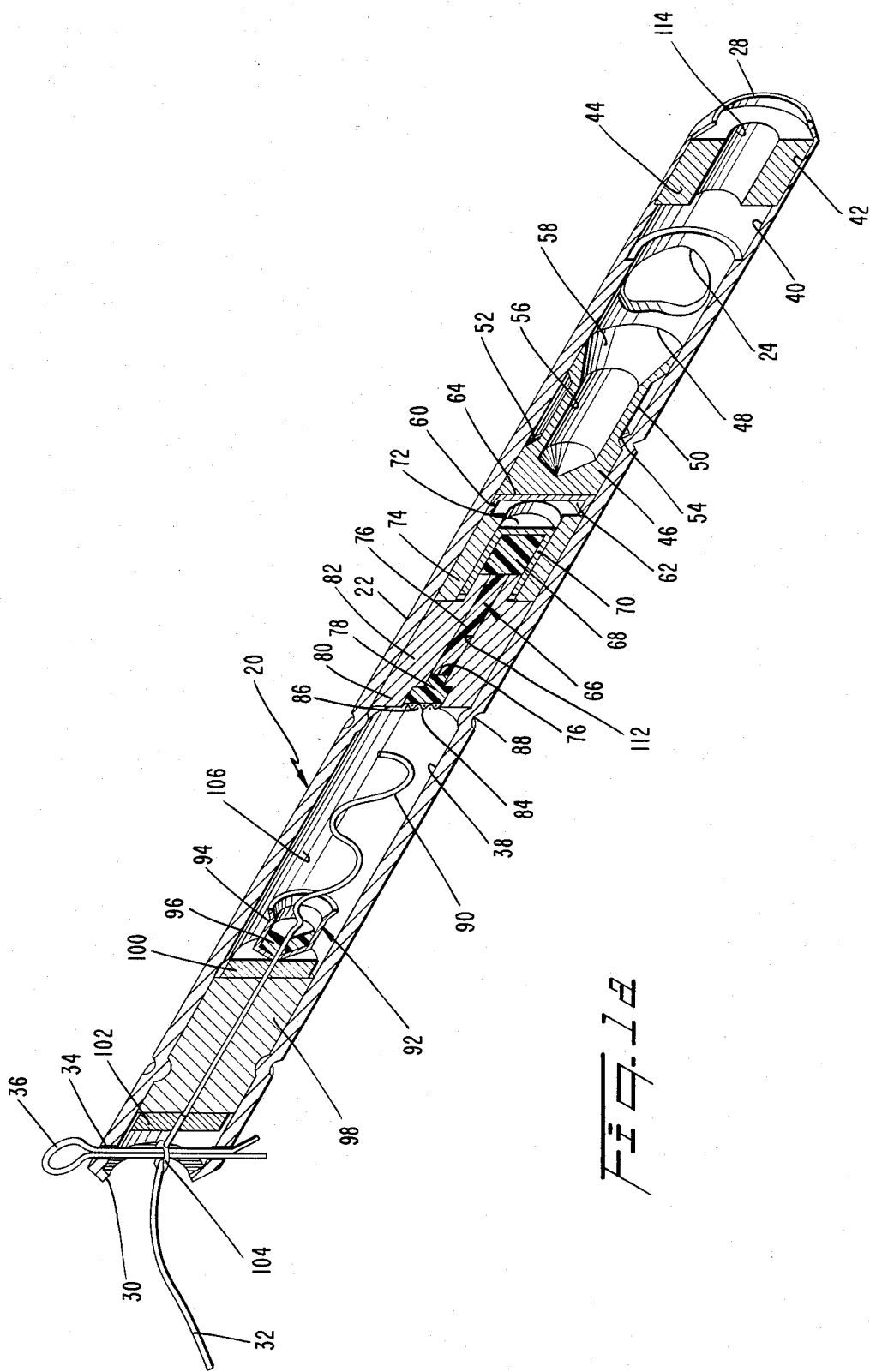
FIG. 1a is an isometric partial cross-sectional view taken through the line cutter of FIG. 1.

A parachute reefing line cutting device 20 (see FIG. 1) includes an elongated generally circularly cylindrical housing 22 which preferably is fabricated from metal. Suitable materials for the housing are stainless steel and aluminum. The housing 22 may, for example, be approximately ½ inch in outside diameter and may have a length of approximately 5 inches. Near a first end 28 of the housing 22, the housing is provided with a pair of lateral openings 24 which are diametrically aligned and which are circular in the direction transverse to the housing centerline. Only one of the circular openings 24 is visible in FIG. 1.

The lateral openings 24 extend transversely of the longitudinal axis of the line cutting device 20 and are sized to receive a reefing line 26 or other line of indeterminate length which needs to be severed into two smaller portions. Projections of the lateral openings or apertures 24 onto the plane containing the housing axis and normal to the line connecting the centers of the apertures 24 have a diameter which is less than the outside diameter of the housing 22. In this fashion, sufficient material strength in the housing remains to contain the explosively driven knife when the line cutting device 20 is actuated.

The first end 28 of the housing 22 adjacent to the lateral apertures 24 is preferably open so that the explosive actuation force in the line cutting device 20 need only act against atmospheric pressure and does not act against a trapped volume of air or other gas. At the second end 30 of the housing 22, an actuating lanyard 32 extends from an end opening in the housing. The lanyard 32 and its cooperating structures will be described more fully hereinafter. A small transverse bore 34 is also provided adjacent the second end 30 of the housing 22. This small bore 34 is designed to receive a locking pin 36 in the nature of a suitable conventional cotter key. This locking pin 36 will be described more fully hereinafter.

Internal features of the line cutting device 20 are illustrated in FIG. 1a. For example, the housing 22 has a generally cylindrical interior surface 38 which extends substantially throughout the entire length of the housing 22. At the first end 28, the interior of the housing 22 is provided with a first counterbore 40 and a second counterbore 42. An annular anvil 44 is positioned in the second counter bore 42 and in abutment with the shoulder defined between the first and second counterbores 40, 42. To retain the anvil 44 within the housing 22, the first end 28 of the housing is crimped inwardly and may have a conical external appearance.

Spaced axially from the anvil 44 is a slidably movable blade 46 which has a diameter that conforms to the internal diameter of the housing 22, i.e., the surface 38, while permitting a sliding fit therebetween. The blade 46 is provided with a circular cutting edge 48 at the forward end thereof and in coaxially spaced opposition to the anvil 44. This edge 48 lies in a plane that is parallel to the plane of the annular face of the anvil. In addition, the blade 46 has a cylindrical exterior surface that is provided with a cylindrical land 50 which extends circumferentially around the blade 46. This cylindrical land 50 reduces the blade surface area in frictional contact with the interior surface 38 of the housing 22 during movement of the blade 46. In addition, the end portions of the cylindrical exterior surface guide the blade 46 for coaxial movement in the housing 22.

The generally cylindrical land 50 also defines a shoulder 52 which cooperates with a positioning detent 54 that is crimped through the housing 22. This positioning detent 54 engages the shoulder 52 to hold the blade 46 in a specific axial position within the housing 22. That specific position is selected such that the circular edge 48 of the blade 46 is axially spaced from the anvil 44 by a distance sufficiently large to accommodate the diameter of the line to be cut. It will also be noted that the first counterbore 40 cooperates with the cylindrical land 50 to provide radial relief around the blade 48 when the blade is actuated. This radial relief or clearance allows the blade 48 to advance without substantial resistance from any elements of the line that are not severed when the blade passes the lateral apertures.

Preferably, the blade 46 and the anvil 44 are fabricated from hardenable steel such as stainless so that a positive severing action will be obtained therebetween when the blade 46 is explosively rammed forward over the resistance of the detent 54.

The blade 46 also has a generally cylindrical bore 56 which is axially positioned therein. A conical surface 58 recedes from the circular edge 48 and blends into the bore 56. With this arrangement of the blade 46, the cavity defined by the conical surface 58 and the cylindrical surface 56 provides a relieving area to receive that portion of the line which is severed between the two opposed lateral openings 24.

In abutment with the circular base of the blade 46, is a gas check 60. This gas check 60 has a diameter which is approximately the same as the diameter of the cylindrical internal surface 38 of the housing 22. In addition, the gas check 60 has a generally cylindrical skirt 62 which extends downwardly from a disc-like central portion 64. The generally cylindrical skirt 62 is sufficiently flexible to be urged radially outwardly and into sealing engagement with the cylindrical surface 38 during movement of the blade 46. In this fashion, the gas pressure released by the pyrotechnic means 66 is restrained from escaping between the blade 46 and the housing 22.

The pyrotechnic assembly 66 includes an output charge or mix 68 which is surrounded by a generally cylindrical sleeve 70 having a closed end 72. A load cup which comprises the sleeve 70 and the closed end 72 has a diameter substantially less than the diameter 38 of the internal housing surface. The sleeve 70 has a length which exceeds the axial distance between the output mix 68 and the central portion 64 of the gas check 60. In this manner, the explosive force from the output mix 68 is initially concentrated on a small part of the gas check 60. An insulating spacer 74 which may be fashioned from aluminum or polytetrafluoroethylene has a generally cylindrical bore that receives the load cup 70, 72 and the output charge 68. The pyrotechnic means 66 also includes a generally cylindrical delay charge 76 which is coaxially aligned with the longitudinal axis of the line cutter 20 and which is contained within a channel 112. The delay charge is provided in a column with a preselected axial length that is selected to yield a predetermined time delay between ignition of the delay charge and detonation of the output charge 68.

At the end 78 of the delay charge 76, which is remote from the blade 46, a suitable starter charge 78 is provided. The starter charge 78 extends from the delay charge 76 into a counterbore of a second insulating sleeve 82 which also surrounds the delay charge 76. In this fashion, the starter mix is provided with a slightly larger exposed surface area 84 for facilitating ignition.

Covering the end of the counterbore 80 is a screen 86. This screen 86 provides support for the starter charge 78 and is pressed and crimped into the counterbore 80. It has been observed during vibration tests that a screen 86 can be effective to avoid any potential for the starter charge to move into the chamber 106. Thus, the screen also contains the starter charge 78 in operative juxtaposition to the delay charge 76. Moreover, the screen may avoid inadvertent contact between the flexible sear 90 and the starter charge 78. The entire pyrotechnic assembly 66 is retained in position within the housing 22 by means of a generally annular crimp 88 extending circumferentially around the housing 22.

In order to ignite the starter mix 78, a frictional ignition assembly 92 is provided. The ignition assembly 92 includes a cup-like element 94 positioned within the housing and containing a compound 96 which can be ignited by frictional movement of the flexible sear element 90. When ignited, the compound 96 generates gases with a sufficient volume to fill the cavity defined between a plug 98 and the insulating sleeve 82 around the delay charge 76. Moreover, the compound 96 has chemical composition which is sufficient to create a temperature in the gases filling the chamber which exceeds the ignition temperature of the starter compound 78 of the pyrotechnic means 66.

The free end of the sear element 90 may be provided with a suitable conventional scratch compound which is designed to increase the frictional engagement between the sear element 90 and the compound 96 contained in the cup 94. The cup 96 is positioned adjacent to a washer 100 having an aperture through the middle thereof which also accommodates the sear element 90. The sear element also extends through the central portion of the plug 98 and outwardly through a second washer 102 at the outside surface of the plug 98 and finally terminates in a loop 104. While the sear element 90 is in its storage position (as shown in FIG. 1a), a flexible membrane of the plug 98 creates an environmental seal between the starting compound 96 and the external environment. Moreover, the plug 98 and its associated seal effectively seal the interior portions of the line cutting device 20 not only as the sear element 90 is withdrawn but also after it has been withdrawn from the interior portion of the housing 22.

In its storage position, the ring 104 at the end of the sear element 90 is in alignment with the transverse bore 34 through the housing 22. More particularly, with this arrangement of the ring 104, the locking pin 36 can be inserted through the bore 34 and through the open central portion of the ring 104. Accordingly, the pin 36 provides a locking assembly to prevent inadvertent withdrawal of the sear element 90.

From the foregoing description, it will now be apparent that the thin flexible sear element 90 permits the operation of the line cutting device through a wide range of angles. More particularly, it will be appreciated that the sear element 90 can be withdrawn from the housing at a wide range of angles on either side of the axis of the line cutting device. This aspect of the present invention is important since it enables the line cutting device to be used in those environments where the positional attitude of the line cutting device at the time of operation either cannot be controlled or cannot be predicted with any degree of certainty.

Furthermore, the line cutting device does not rely on a spring for any of its operation. Accordingly, problems such as permanent set, undetected fractures, and inappropriately directed acceleration forces are avoided.

The operation of the line cutting device 20 will now be described in greater detail in connection with the remaining figures. When the locking pin 36 (see FIG. 1a) has been removed, the sear element 90 can be withdrawn from the line cutting device 20 by pulling on the lanyard 32. In generating the frictional ignition provided by the sear element 90 in cooperation with the compound 96, the sear element can be withdrawn at relatively large velocities.

Figure 2:
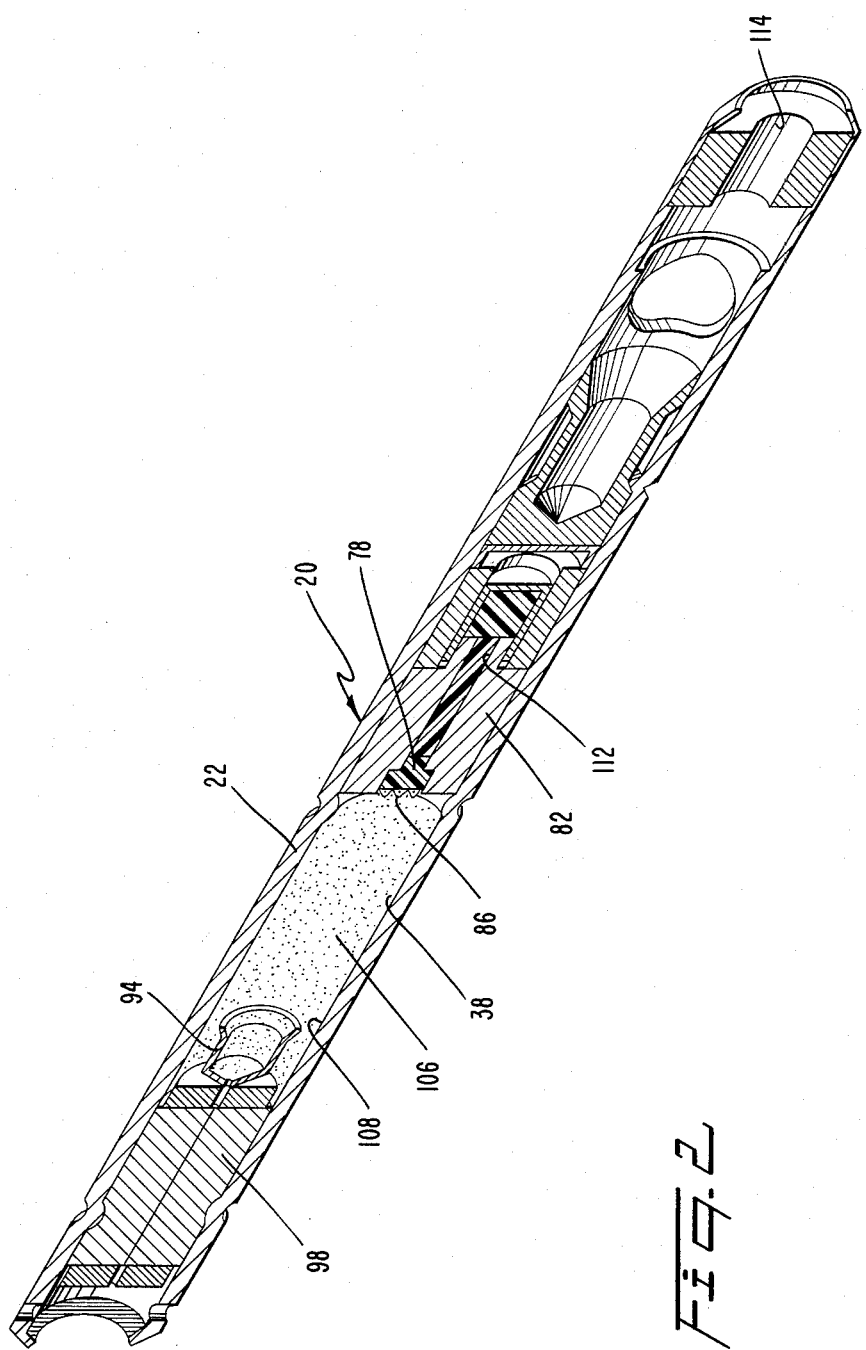
FIG. 2 is an isometric partial cross-sectional view similar to FIG. 1a but showing removal of the flexible wire sear.

As the sear element is withdrawn, the compound 96 is ignited by the sear element 90 and burns quite quickly (see FIG. 2) in an exothermic reaction. During this exothermic reaction, heat and gaseous reaction products are generated. Those gaseous reaction products 106 fill the cavity 108 defined between the seal 98 and the insulating sleeve 82 provided inside the housing 22. The temperature of the gases 106 exceeds the kindling temperature or ignition temperature of the starter compound 78. Accordingly, the gases 106 cause ignition of the starter compound 78 which commences to burn. It will be noted that the screen 86 provided at the end of the insulating sleeve 82 and covering the surface of the starting compound 78 does not interfere with ignition or burning of the starter compound 78 since the gases generated by the friction starting means 92 can freely penetrate the screen.

Figure 3:
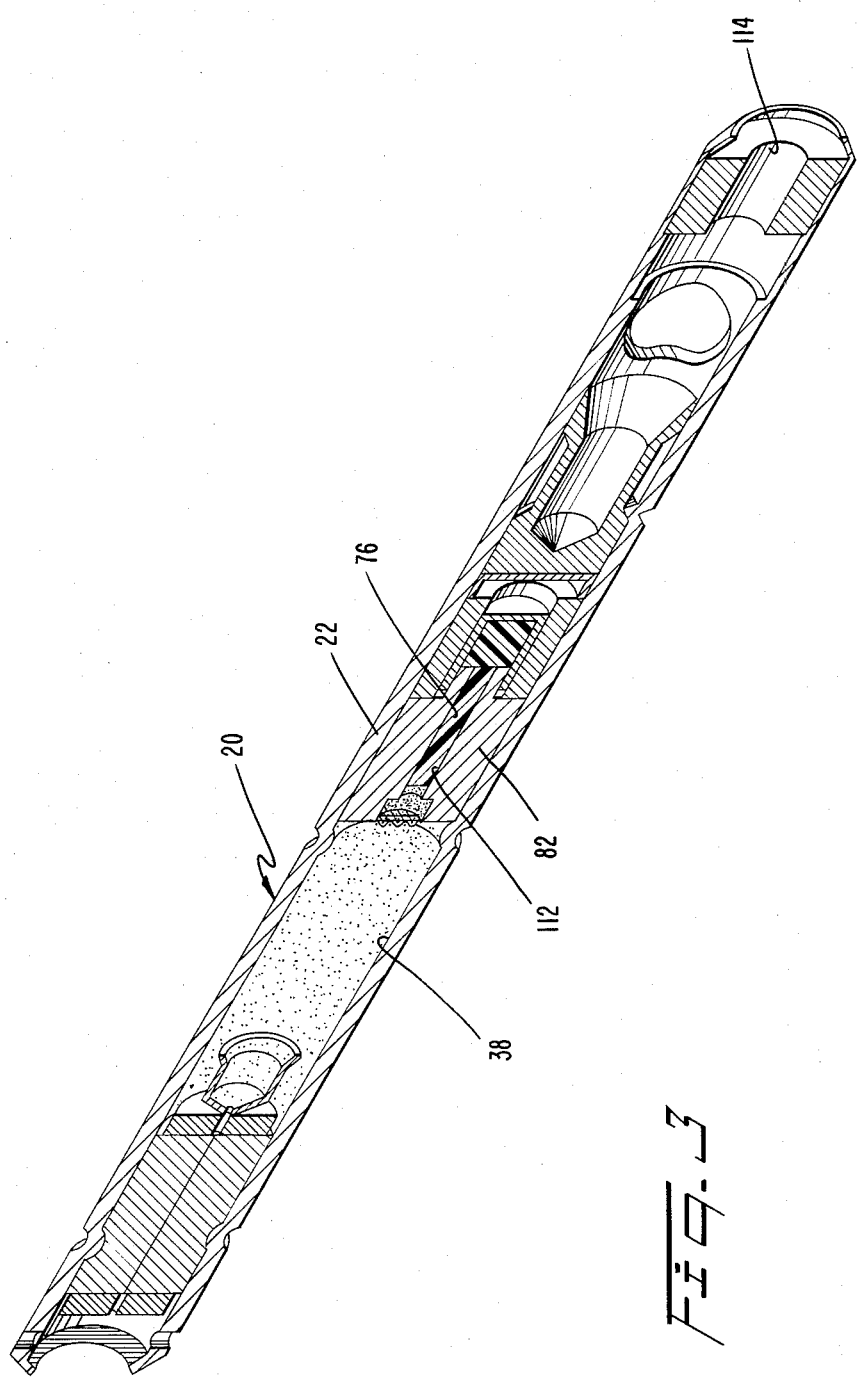
FIG. 3 is an isometric partial cross-sectional view similar to FIG. 2 but showing the ignition of the primer charge.

As the starter compound 78 burns to completion (FIG. 3) it ignites the delay compound 76 which is in intimate contact therewith. The delay charge 76 is sized to provide a predetermined time delay between the time that the sear element is withdrawn and the line is severed. More particularly, the delay compound is like a fuse which can burn at a predetermined rate. That predetermined rate is a function of a number of parameters including ambient temperature, length of the column, diameter of the column, degree of compaction of the material in the column and the proportions of the constituents in the compound 76.

By providing the insulating sleeve 82 around the delay mix 76 and by locating the delay mix 76 in a central portion of that sleeve 82, a comparatively small cylindrical surface is provided across which heat may be transferred away from the delay column 76. Accordingly, since there is a considerably smaller heat transfer surface the insulating column 82 provides a more uniform environment in which the delay compound burns. The insulating column thus contributes to a more uniform temperature of the exothermic reaction associated with the delay mix 76.

In the foregoing manner, materially improved results on reliability of the line cutting device are obtained. For example, these line cutting devices generally function in a temperature range of $-65°$ F. to plus $+160°$ F. The units which have been heretofore available operate between limits of 25% above and 15% below the nominal delay time. However, with the insulating sleeve of the present invention, it has been possible to reduce these tolerances to 10% above and below the nominal delay time throughout that operating range of environmental temperatures.

Figure 4:
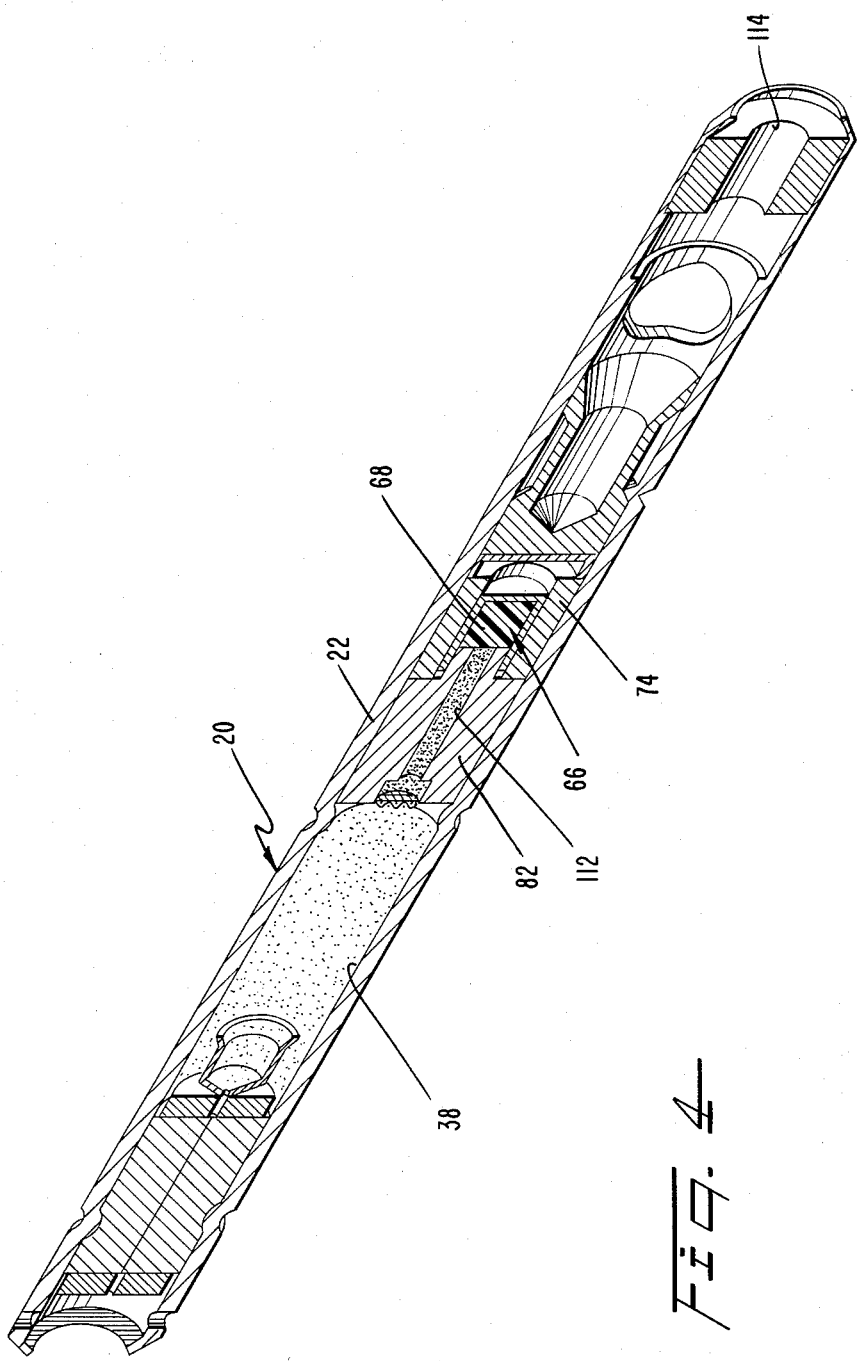
FIG. 4 is an isometric partial cross-sectional view similar to FIG. 3 at the end of the pyrotechnic time delay.

When the delay compound 76 (see FIG. 3) has burned to conclusion, it ignites or detonates the output compound 68 (see FIG. 4) of the pyrotechnic means 66. As the explosive charge 68 is detonated, it creates a large volume of high pressure gas 110 (see FIG. 5) that immediately starts to push the loadcup 70, 72 forwardly and into direct contact with the gas check 60. At this point in time, the gases 110 are contained in a comparatively small volume defined by the loadcup 70, 72, the insulating sleeve 74 and the insulating sleeve 82. Since the insulating sleeve 82 only has a very small orifice or channel 112 extending longitudinally therethrough, the insulating sleeve 82 also creates a flow restriction which substantially impedes the release of pressure and gases from the chamber which contained the output mix 68. Accordingly, the gases 110 are concentrated in immediate juxtaposition to the back end of the blade 46.

As the gases 110 expand, they force the blade 46 against the resistance created by the detent nipple 54 until the pressure-area forces generated by the gases are sufficiently great to overcome that resistance. At this point, the blade 46 is rammed forwardly (see FIG. 6) by those pressure-area forces such that the forward edge 48 severs any line protruding through the lateral openings 24.

The cutting process takes place in a first stage as the knife edge 48 shears past the opening 24 on each side of the housing 22. Subsequently, the blade 46 impacts with the anvil 44 completing a second stage of the severing operation. It will be noted, that to the extent that any material from the line being severed would be retained inside the housing 22, the opening defined by the cylindrical surface 56 and the conical surface 58 of the blade 46 accommodate that material. Moreover, by providing the channel 114 that extends axially through the anvil 44, no air or gas pressure buildup occurs between the blade 46 and the anvil 44. In this fashion, the only force resisting the movement of the blade is ambient pressure acting over the area of the blade cross section and the resistance created by the presence of the line to be severed.

It should now be apparent that an explosive line cutting device has been disclosed which overcomes the problems of the type discussed above in connection with the prior art and which satisfies the objects and the advantages of the present invention.

For example, the line cutting device of the present invention can be actuated from a wide variety of positional attitudes. Moreover, the line cutting device of the present invention is sealed from degradating influences of pressure, temperature and humidity in the environment. Still further, the present invention provides a line cutting device in which the insulating column protects the exothermic reaction of the delay fuse so as to avoid significant heat transfer away from that reaction zone. In this fashion, the deviation from the nominal burning time of the delay is reduced to approximately half of the deviations in burning times heretofore available. And finally, by providing a restriction in the housing prohibiting release of the gases and pressures created by the explosion to the parts of the housing not directly associated with movement of the blade, the pressure forces are concentrated in the most desirable location, directly behind the blade itself. Accordingly, smaller quantities of the explosive compound can be used or, in the alternative, larger and tougher lines can be severed with the device.

It will now be apparent that the present invention provides a new and improved explosive line cutter useful for severing lines. Moreover, it will be apparent to those skilled in the art that numerous modifications, variations, substitutions and equivalents exist for various features of the invention. Accordingly, it is expressly intended that all such modifications, variations, substitutions and equivalents which exist for features of the invention which do not depart from the spirit and scope of the invention as defined in the appended claims, be embraced thereby.

I claim:

1. A line severing device operable to cut a line of indefinite length into at least two shorter portions, comprising:
    a housing containing a movable blade and an anvil spaced therefrom by a distance preselected to accommodate a line to be severed;
    pyrotechnic means contained in the housing positioned at an end of the blade remote from the anvil and having an output charge operable to generate an explosive force to drive the blade toward the anvil; and
    an igniter contained in the housing comprising a flexible sear element, an igniter charge and a flexible seal, said sear element being withdrawable through said igniter charge and said flexible seal, said igniter charge being ignited by friction between said charge and said sear element, said flexible seal environmentally sealing said housing before and after said sear element is withdrawn, said igniter being operable to ignite the pyrotechnic means when the flexible sear element is withdrawn.

2. The line severing device of claim 1 wherein a gas flow restriction is positioned between the output charge and the friction ignition means such that gases generating the explosive force are concentrated behind the blade.

3. The line severing device of claim 1 wherein the pyrotechnic means is insulated from the environment thereby reducing heat transfer away from the exothermic reaction of the pyrotechnic means.

4. The line severing device of claim 3 wherein the pyrotechnic means is contained in a polytetrafluoroethylene sleeve.

5. The line severing device of claim 1 wherein the pyrotechnic means also includes a delay charge for providing a predetermined time delay between ignition of the pyrotechnic means and generation of an explosive force.

6. The line severing device of claim 5 wherein the pyrotechnic means further includes a temperature actuated starter charge at one end of the delay charge, the starter charge being initially ignited by hot gases generated by the ignition charge.

7. The line severing device of claim 6 wherein a screen retains the starter charge against dislocation.

8. The line severing device of claim 1 wherein said igniter further comprises at least one washer having an aperture through which said sear element is withdrawn.

9. The line severing device of claim 8 wherein said igniter includes washers located at opposite ends of said flexible seal.

10. The line severing device of claim 9 wherein said igniter and said pyrotechnic means are spaced apart within said housing to define a cavity, at least a portion of said sear element being stowed within said cavity.

11. The line severing device of claim 10 wherein said igniter charge upon ignition discharges hot gases into said cavity, said hot gases igniting said pyrotechnic means.

12. A line severing device operable to cut a line of indefinite length into at least two shorter positions, comprising:
    a housing containing a movable blade and an anvil spaced therefrom by a distance preselected to accommodate a line to be severed;
    pyrotechnic means contained in the housing at an end of the blade remote from the anvil, having an output charge and a delay charge and being operable to generate an explosive force to drive the blade toward the anvil;
    ignition means contained in the housing and operable to ignite the pyrotechnic means; and
    means for creating an insulating means around the delay charge to impede heat transfer from the exothermic reaction as the delay charge burns.

13. The line severing device of claim 12 wherein the insulating means also restricts the flow of gases from the output charge such that gases generating the explosive force are concentrated behind the blade.

14. The line severing device of claim 12 wherein seals are provided to isolate the ignition means and the pyrotechnic means from the environment.

15. The line severing device of claim 12 wherein the pyrotechnic means includes a starter charge at an end of the delay charge, the starter charge being ignitable by hot gases.

16. The line severing device of claim 15 wherein the ignition means is spaced from the pyrotechnic means and is operable to generate hot gases which, in turn, ignite the starter charge.

17. A method of severing a line which passes through a housing comprising the steps of:
    frictionally igniting an ignition charge to generate hot gases within the housing;
    allowing the hot gases to ignite a starter charge spaced from the ignition charge;
    delaying detonation of an explosive charge by burning a delay charge between the starter charge and the explosive charge;
    insulating the delay charge to impede heat transfer away from that charge; and
    detonating the explosive charge to drive a knife toward an anvil with the line to be severed therebetween.

18. The method of claim 17 futher including the step of restricting the flow of gases away from the explosive charge in a direction away from the movement of the knife to thereby concentrate gases from the explosive charge behind the knife.

* * * * *